(12) United States Patent  
Anderson et al.

(10) Patent No.: US 7,182,383 B2
(45) Date of Patent: *Feb. 27, 2007

(54) MODULAR SYSTEM FOR A VEHICLE

(75) Inventors: Kermit M. Anderson, Holland, MI (US); Mark P. Kadzban, Grandville, MI (US); Matthew A. Kalis, Hudsonville, MI (US); Scott T. Williams, Holland, MI (US); Alan G. Greene, Grandville, MI (US); Leif Norland, Holland, MI (US)

(73) Assignee: Johnson Controls Technology Company, Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/971,754

(22) Filed: Oct. 21, 2004

(65) Prior Publication Data

US 2005/0082862 A1    Apr. 21, 2005

Related U.S. Application Data

(63) Continuation of application No. 10/316,162, filed on Dec. 10, 2002, now Pat. No. 6,827,384, which is a continuation-in-part of application No. 09/846,811, filed on May 1, 2001, now Pat. No. 6,669,260.

(51) Int. Cl.
*B60R 11/00* (2006.01)
(52) U.S. Cl. .................... 296/37.8; 296/214; 224/311
(58) Field of Classification Search ............... 296/37.7, 296/37.8, 214; 224/311
See application file for complete search history.

(56) References Cited

U.S. PATENT DOCUMENTS

| 4,270,328 | A | * | 6/1981 | Page et al. ................. 52/511 |
| 5,599,086 | A | * | 2/1997 | Dutta ....................... 362/490 |
| 5,954,252 | A | * | 9/1999 | Gebreselassie et al. ..... 224/311 |
| 6,203,088 | B1 | * | 3/2001 | Fernandez et al. ......... 296/37.8 |
| 6,575,528 | B2 | | 6/2003 | Tiesler et al. |
| 6,619,716 | B1 | | 9/2003 | Sturt |
| 6,749,244 | B1 | | 6/2004 | Song |
| 2003/0098595 | A1 | | 5/2003 | Carter et al. |
| 2004/0160072 | A1 | | 8/2004 | Carter et al. |
| 2004/0169390 | A1 | | 9/2004 | Tiesler et al. |

OTHER PUBLICATIONS

Huisingh, "JCI Overhead Rail System", New Technology and Innovations Submittal Form, May 10, 2002 (6 pgs).
Johnson Controls, "U251 Overhead Rail Opportuniites", Oct. 8, 2002 (20 pgs).

(Continued)

*Primary Examiner*—Joseph D. Pape
(74) *Attorney, Agent, or Firm*—Foley & Lardner LLP

(57) ABSTRACT

An overhead rail system for a vehicle interior includes an elongated rail configured to extend at least partially along a headliner panel within the vehicle interior. A longitudinal opening extends at least partially along a length of the rail. An article has a housing and a movable panel. The movable panel is configured to provide access to an object. A holder is coupled to the article and has a catch configured to coact with the opening in the rail, so that the article is mountable to the rail proximate the headliner panel for use by occupants within the vehicle interior.

37 Claims, 11 Drawing Sheets

OTHER PUBLICATIONS

Johnson Controls, "2007 Escape Interior Opportunities", Sep. 25, 2002 (41 pgs).

Johnson Controls, "The Daily Update on Automotive Technologies", autotech daily™, Jul. 26, 2002 (p. 2 of 4).

Johnson Controls, "LifeStyles™ Overhead Rail System", Commercial Review, Jan. 25, 2002 (25 pages).

Lacey, "Johnson Controls' New Overhead Rail System Receives Recognition from Industrial Design Group", Jul. 24, 2002 (2 pgs.).

* cited by examiner

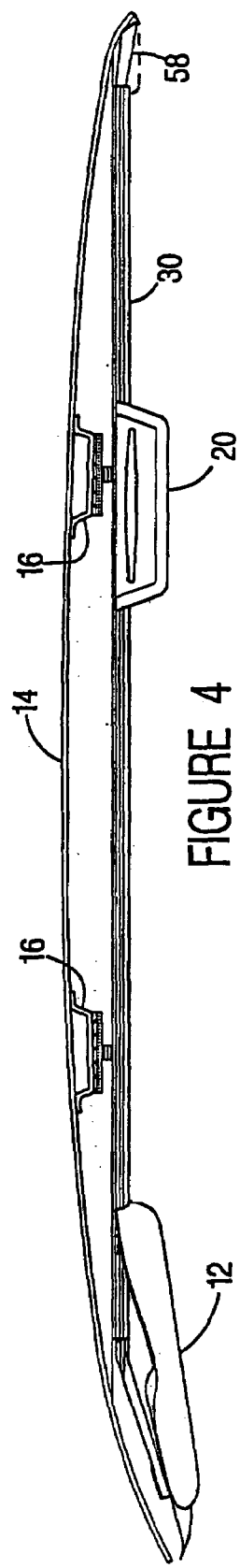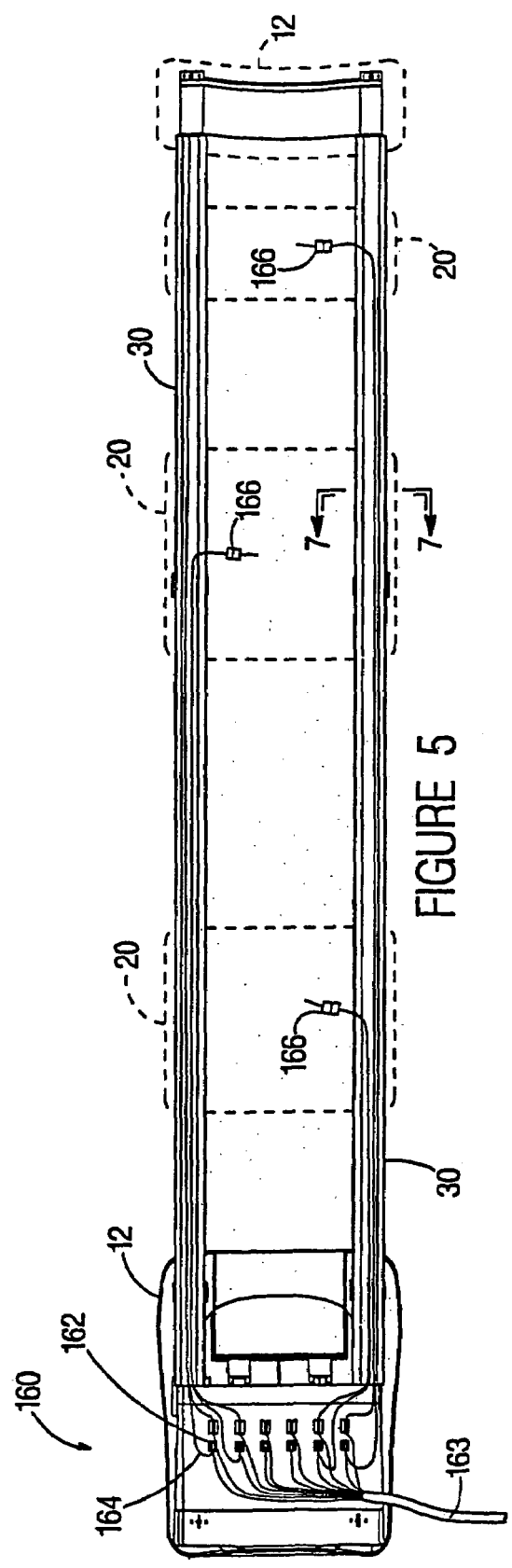

MODULAR SYSTEM FOR A VEHICLE

CROSS REFERENCE TO RELATED APPLICATIONS

The present application claims the benefit of priority under 35 U.S.C. § 120 to the following patent applications: U.S. patent application Ser. No. 10/316,162 titled "Modular System for a Vehicle" filed on Dec. 10, 2002, now U.S. Pat. No. 6,827,384 which claims priority to U.S. patent application Ser. No. 09/846,811 titled "Modular System for a Vehicle" filed May 1, 2001 (now U.S. Pat. No. 6,669,260 issued on Dec. 30, 2003) which are both incorporated by reference.

FIELD

The present invention relates to a modular system for a vehicle. The present invention relates more particularly to an overhead rail system for articles in a vehicle.

BACKGROUND

Modular storage compartments in the forward portion of vehicles are generally known and include consoles and structures for mounting items such as lamps, small storage compartments and electronic instrumentation such as compasses, temperature displays and clocks. Such modular systems typically have mounting configurations that permanently attach such articles to a structural portion of the vehicle, whereby installation of article options are typically conducted in a factory setting during vehicle construction and often requires user-selection of the desired articles prior to vehicle assembly, or user acceptance of preinstalled option packages.

Accordingly, it would be advantageous to provide a modular system for interchangably mounting a wide array of selectively removable, user-oriented articles that are adapted for use within, or in conjunction with, a vehicle. It would also be advantageous to provide such a modular system along substantially the entire length of the interior overhead portion of a vehicle as well as the interior sides of a vehicle, or within the interior cargo space of a vehicle. It would also be advantageous to provide a modular system that provides concealed distribution of utilities from vehicle utility supply sources to the interchangably selected articles. It would be further advantageous to provide a modular system whereby certain classes of articles are capable of installation only in predetermined portions of a vehicle area to minimize potential distractions to a vehicle operator.

SUMMARY

The present invention relates to a system for attaching articles within a vehicle. The system includes at least one rail for attachment to an overhead portion of the vehicle and an opening extending substantially along the rail. An article has a housing to receive an object within the housing. A holder has a first portion coupled to the article and a second portion configured to releasably engage the opening at a location along the rail, so that the article and the object are removably supported by the rail.

The present invention also relates to an overhead rail system for a vehicle interior. The system includes an elongated rail configured to extend at least partially along a headliner panel within the vehicle interior. A longitudinal opening extends at least partially along a length of the rail. An article has a housing and a movable panel configured to provide access to an object and a holder is coupled to the article and has at least one catch to coact with the opening in the rail, so that the article is mountable to the rail proximate the headliner panel for use by occupants within the vehicle interior.

The present invention further relates to an overhead system for use in a vehicle interior. The system includes a headliner panel and at least one rail connected to the headliner panel by connectors and configured to face the vehicle interior. An opening along the rail configured to engage at least one article for use within the vehicle interior.

The present invention also relates to a modular overhead console system for an interior portion of a vehicle and includes at least one rail member attached to an overhead panel within the vehicle with an opening extending substantially along the rail member. A module has a housing capable of receiving an object within the housing. A holder is coupled to the module and has at least one projection to engage the opening, so that the module is attachable to the rail member for positioning within an overhead interior area of the vehicle.

BRIEF DESCRIPTION OF THE DRAWINGS

FIG. 4 is a side elevation of a modular system according to the embodiment of FIG. 1.

FIG. 5 is an upward looking bottom view of a modular system according to the embodiment of FIG. 1.

DETAILED DESCRIPTION

Figure 1:
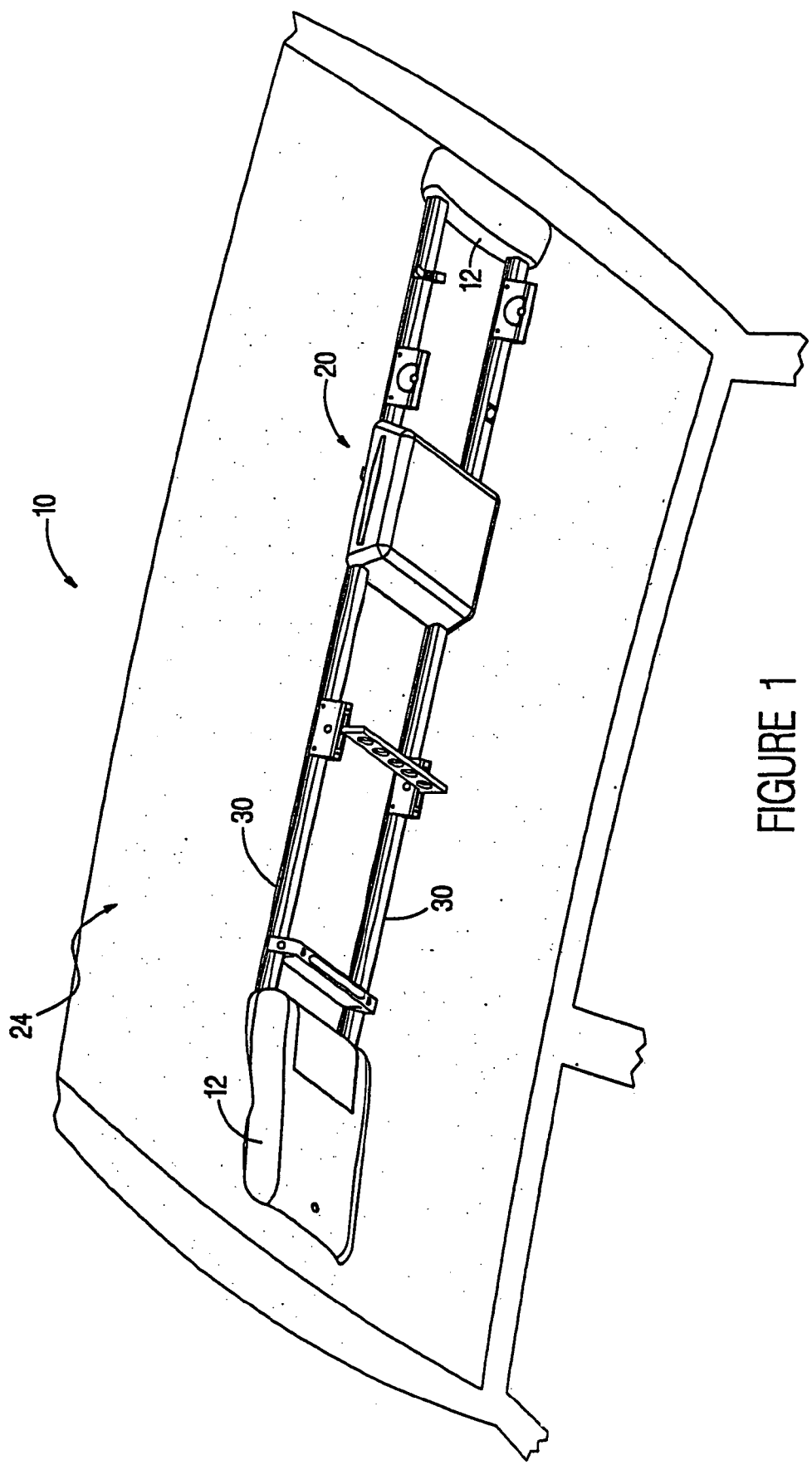
FIG. 1 is an upward-looking perspective view of a modular system mounted on a vehicle interior according to one embodiment.
Figure 2:
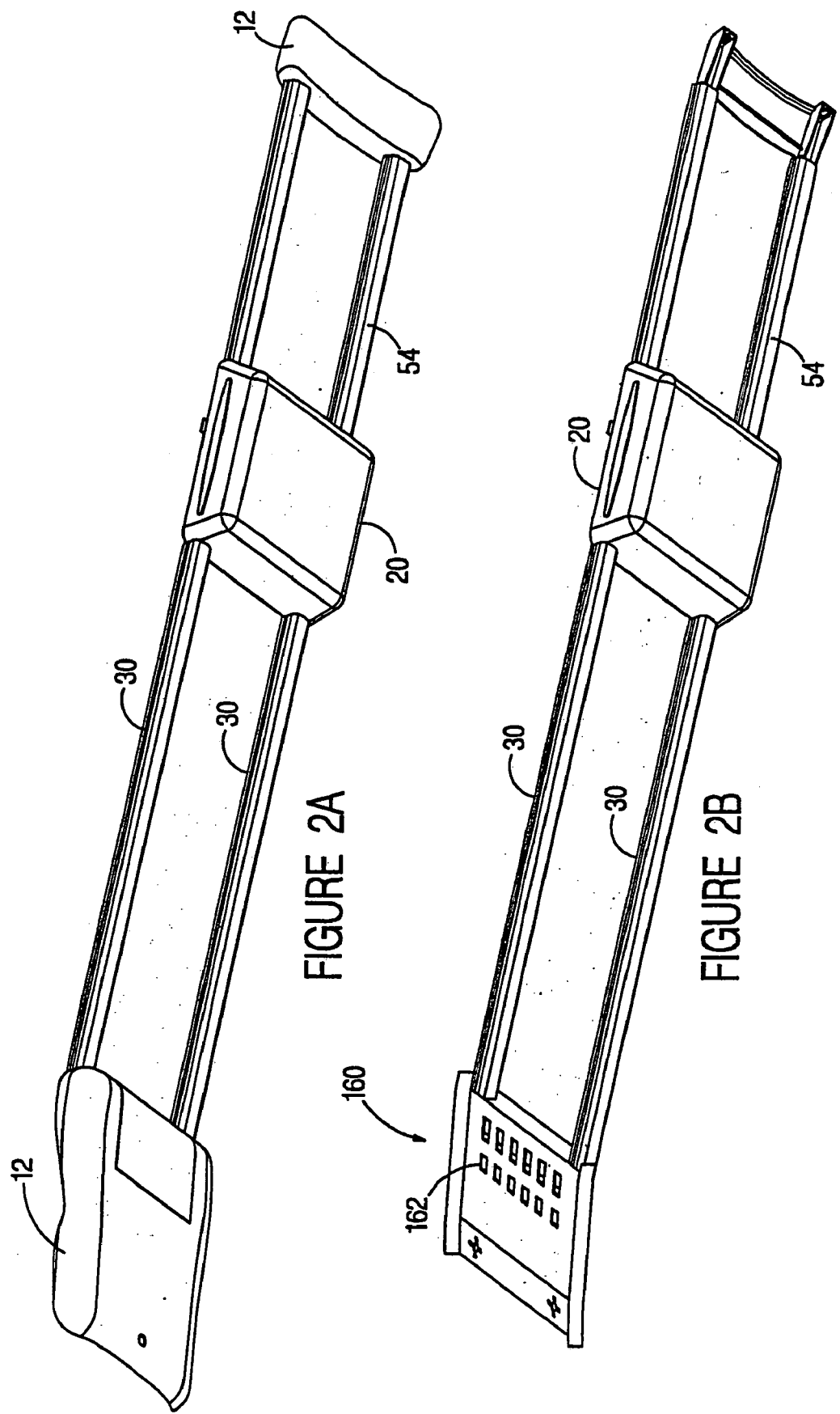
FIG. 2A is an upward looking perspective view of a modular system with end cover trim pieces according to the embodiment of FIG. 1.
FIG. 2B is an upward looking perspective view of a modular system with end cover trim pieces removed according to the embodiment of FIG. 2A.

Referring to FIGS. 1 and 2, a modular system 10 for mounting one or more articles 20 is shown schematically (exemplary articles will be further described herein) along an interior panel 24 (e.g. door or side panel, cover, headliner, etc.) of a vehicle according to an embodiment. System 10 may also be adapted for mounting articles 20 along the sides of the vehicle such as door or side panels, or within the interior space of the vehicle such as cargo areas, etc. System 10 is shown to include two generally parallel mounting members 30 such as rails, tracks, channels, holders, bars, rods, poles, etc. that are oriented in a longitudinal configuration within a vehicle along interior panel 24. Rails 30 are shown to have a lateral spacing that is generally fixed for a particular vehicle style, but the spacing may vary between different vehicle styles and models and may have any lateral spacing suitable for mounting articles 20. One or more positioners 31 (shown schematically as back brackets in FIG. 3) may be used to secure the lateral spacing of rails 30 for receiving articles 20. For overhead applications, rails 30 may be oriented longitudinally and centered laterally within the vehicle, but may be located at any lateral position on the interior panel 24 to accommodate mounting of articles 20. In an alternative embodiment, the rails may be separated into a forward segment and/or a rearward segment (not shown) for adapting to roof windows or other discontinuities in roof structures. The rails may also be oriented laterally along an interior panel to increase the flexibility and utility of the system for interchangeably receiving the articles. In another alternative embodiment, a single rail may be used in conjunction with articles that are adapted to selectively and interchangeably engage a single rail. In a further alternative embodiment, the rail(s) may be mounted to pillars (not shown) or other support columns within the interior space of a vehicle to provide a system for attaching articles. Such pillars may be secured by brackets or fixtures mounted to the rails for increased flexibility in attaching various articles to the rails.

Figure 6:
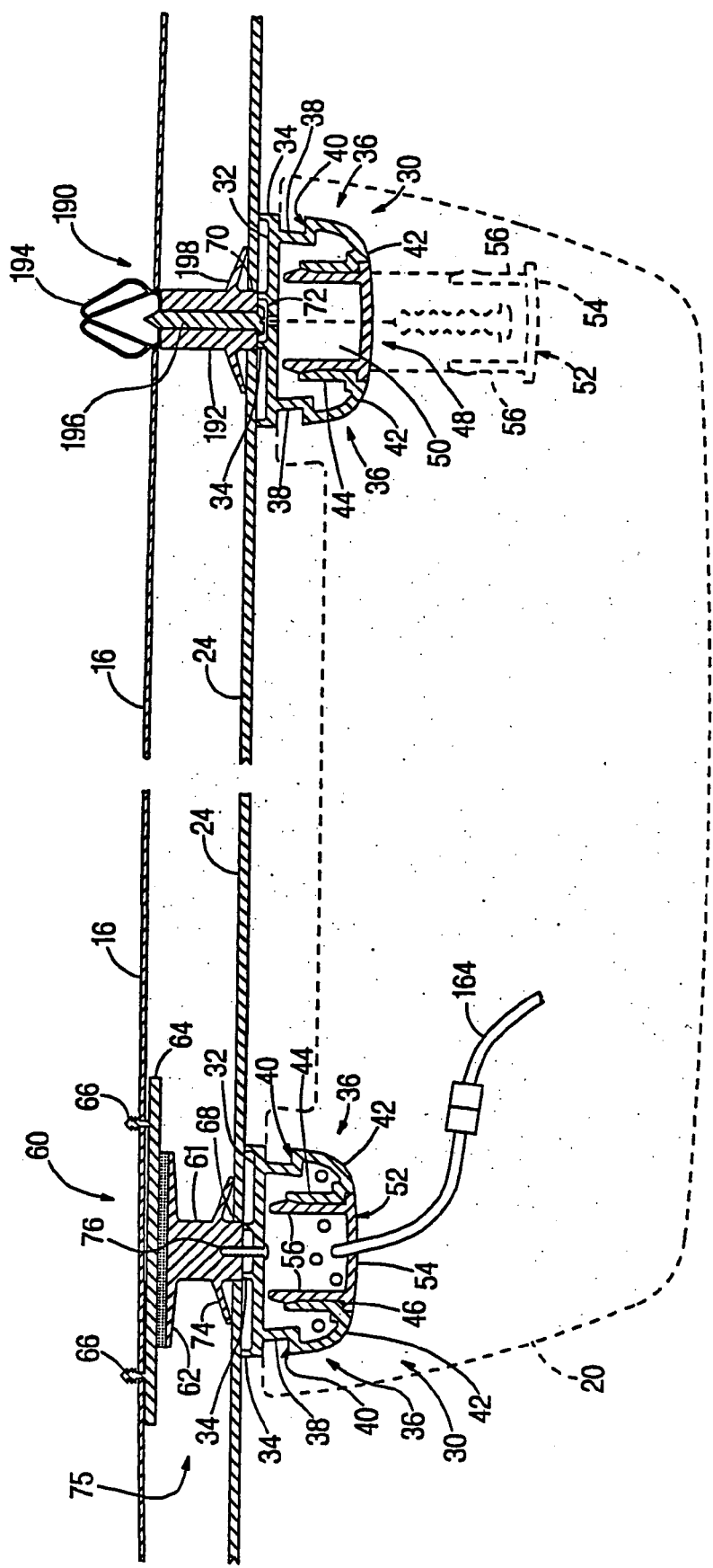
FIG. 6 is a cross sectional view of a modular system along line 6—6 of FIG. 3 according to a preferred embodiment.

Referring to FIG. 6, the structural shape of rails 30 are shown according to an embodiment. Rails 30 have a generally hollow cross sectional shape (as shown schematically in FIG. 6), and include a generally flat base 32 (e.g. back, contact surface, etc.) on the top of rail 30 with several longitudinal ribs 34 projecting therefrom. One pair of ribs 34 are provided at the outside edges and are intended to grip the surface of interior panel 24 and another pair of ribs 34 are located centrally for alignment with connectors 190 or 60 when rails 30 are secured to the roof structure. Rails 30 further include integral sides 36 having a recess 38 (e.g. notch, inset, slot, groove, channel, etc.) forming an outwardly projecting supporting ledge 40 (e.g. corner, shoulder, edge, etc.). Recesses 38 and ledges 40 are intended to provide an external structure for receiving and supporting articles 20 (shown schematically) having corresponding structure adapted to mate with or engage ledges 40. According to the illustrated embodiment ledge 40 is horizontal, and ledge 40 and recess 38 form an angle of approximately 90 degrees or less for providing a structure for receiving holders to support articles 20. In an alternative embodiment, the rails may have a circular cross sectional shape (not shown) or any other shape where the exterior surface is configured to provide structure for receiving and supporting the articles. In another alternative embodiment, the rails may have a second recess and ledge for providing an alternative article mounting interface and providing interlocks that may prohibit or allow installation of certain articles along particular locations of the rails.

Beneath ledges 40, sides 36 are shown to include inwardly curved lower sections 42 that terminate into a return bend 44 providing internal corners 46 to create a longitudinal opening 48. Opening 48 creates a passage 50 (e.g. channel, path, conduit, tunnel, etc.) within rails 30 for routing utility carriers such as wires, cables, fiber optics, etc. as shown schematically in FIGS. 5 and 6. A removable cap 52 is provided generally along the entire length of rail 30 having a cover 54 to cover opening 48 and retain the utility carriers, and may have a flush fit with rail 30, or may have projecting contours, ribs, or other decorative or useful structure (not shown). Cap 52 includes two inwardly projecting legs 56 that fit within opening 48 and are removably retained in place by an interference type, snap-fit engagement with return bends 44. Opening 48 may be entirely or partially concealed by inserting one or more caps 52 having various lengths tailored to create an access pattern of "gaps" between the caps. The access pattern may be created or modified at any time for providing access to opening 48 along the length of rail 30. Rail 30 and cap 52 are preferably made of acrylonitrile butiadene styrene (ABS) plastic in an extrusion process, and may be provided in a wide variety of colors designed to accent an interior trim color scheme. Alternatively, rails 30 and cap 52 may be made of aluminum or any other suitable material, wherein rails 30 and/or cap 52 may also serve as a conductor for transmitting low voltage electrical power from a vehicle supply source to articles 20 mounted on rails 30. The outer surface of the aluminum rails is preferably anodized which provides an insulating layer on the exterior of the rail, which may be selectively removed to provide a custom-tailored electrical conductivity access pattern. Portions of rails 30 and cap 52 that are not otherwise enclosed by articles 20 may also have a separate insulating cover (not shown) that snap fits into recesses 38 and ledges 40 to electrically isolate rails 30 from consumer contact or inadvertent contact with an electrical ground. Rails 30 and cap 52 may also be made of any other material suitable for forming an elongated support member and receiving mounting structure from articles 20 to be supported therefrom.

Referring to FIG. 4, rails 30 are shown secured to the vehicle according to one embodiment. Rails 30 may have ends attached directly to the frame of the roof structure (e.g. crossbows, headers, etc.), or rails 30 may be attached to the roof frame via fixtures shown schematically as brackets 58. Brackets may also be provided to support the ends of rail segments that abut a roof discontinuity such as a sunroof, etc. The forward and rearward end connections of rails 30 are shown covered by suitable trim components such as a bezel or molding 12. Rails 30 may have a side profile that is straight, or a side profile that is slightly curved or bowed (not shown) to correspond generally with the profile of panel 14 (shown as a roof panel). In an alternative embodiment, the rails may be secured to door panel structures or to pillars or other support columns within the interior of the vehicle. Such support columns may be permanently fixed to the interior vehicle structure or may be removably or retractably attached to vehicle structure such as the floor, roof or sides of the vehicle to create a modular system for attaching articles within any interior location of a vehicle. According to another alternative embodiment, the ends of rails 30 may be rigidly attached to the roof frame, such as at the forward and rearward edges, by welding, brazing or fastening with conventional fasteners.

Referring further to FIGS. 4 and 6, a structural support system for the interior span of rails 30 is shown according to an embodiment. The interior span of rails 30 are coupled to the roof structure of the vehicle using connectors 190 (e.g. Z-axis clips) having a spacer portion 192 with spring clip 194. Fastener 196 may be used to secure rail 30 to spacer portion 192 and for securing spacer portion 192 to spring clip 194 to ensure the structural integrity of system 10. Spacer portion 192 may project through an aperture 70 in panel 24 to provide secure abutment with the back of rail 30, and supports 198 may project outwardly from spacer portion 192 to provide support to panel 24 around aperture 70. Connectors 190 are attached to one or more lateral frame members 16 (e.g. beams, roof bows, door panels, floor panels, cross headers, etc.) at a lateral position along frame member 16 corresponding to the installation position of rails 30.

Another connector type may be used such as that shown by connector 60 in FIG. 6. Connectors 60 have a spacer portion 61 and a base portion 62 coupled to a platform 64 that is attached to frame member 16 by finned-plugs 66 (e.g., "Christmas tree connectors") or by a structural adhesive (not shown) such as "BETAMATE 73705" which is a polyurethane adhesive manufactured by the Dow Chemical Corporation and available through Sound Alliance, LLC located in Auburn Hills, Mich. The end of connector 60 opposite from base 62 has a pedestal section 68 that extends through aperture 70 in panel 24 to engage base 32 of rails 30. The end of pedestal 68 is configured to abut ribs 34, and an a projection (not shown) may be provided extending from the end of pedestal 68 and configured to be captured between longitudinal ribs 34 to improve lateral stability of rails 30. Connectors 60 are further shown to include supports 74 (wings, braces, arms, etc.) to support the back surface of panel 24 in the proximity of aperture 70. Connectors 190 and 60 are preferably made from ABS, polycarbonate or other suitable plastic and spring clip 194 is made from heat-treated spring steel or wire, however, connectors 190 and 60 may have any shape and material composition appropriate for transferring the load from system 10 through rails 30 to frame member 16, and connector 60 may be attached to frame member 16 by any suitable means providing the appropriate tensile strength. Connectors 190 and 60 have a spacer length corresponding to the gap 75 between frame member 16 and panel 24. Following panel 24 installation over pedestal 68 of connectors 60 in the vehicle, rails 30 may be positioned over panel 24 and aligned with connectors 190 or 60, whereby rails 30 are secured by a threaded fastener 196 or 76 through base 32 and into connector 190 or 60. In alternative embodiments, other connector structures may be used such as solid blocks (not shown), and the panel may be provided without apertures whereby a fastener penetrates the base, panel and the connector. In another alternative embodiment, the rails may be bowed into a shallow arch-like profile and installed with a compression fit between the forward and rearward ends of the roof frame, or other vehicle structure such as floor and roof panels, thus obviating or minimizing the need for mid-span connectors. Further, the rails may be mounted against the panel, or alternatively the panel segments may be positioned around the rails. In a further alternative embodiment, connectors may include a two-piece reclosable fastener system (not shown) such as "DUAL LOCK"® having mushroom-head shaped projections and manufactured by the Minnesota Mining and Manufacturing Company, or by a nylon "VELCRO"® hook and fastener structure available from Velcro USA Inc. located in Manchester, N.H.

Referring further to FIG. 1, a variety of articles 20 may be mounted to rails 30 according to any exemplary embodiment. Articles 20 may include storage compartments (with or without key-lock access control) tailored to hold tissues, sunglasses, remote control devices, wireless phones, pagers, personal data assistants (PDA), walkie-talkies, binoculars, cameras, first aid or road-side emergency kits, tools, baby-care products and supplies, arts and crafts supplies, toys, sporting goods, books, maps, hunting and fishing equipment, and many other articles for which readily accessible storage in a vehicle may be useful. Such storage compartments may either be fixed or designed for pull-down, drop-down or rotational access where the compartment is recessed during storage and extended for access during usage. Articles 20 may also include handles, brackets, fixtures (e.g. "starter block") for mounting racks, cages, or support pillars for optionally receiving rails 30 to mount additional articles 20 in a cargo area, lighting equipment, power adapters and outlets, lighters; visual display screens; audio equipment; media displays; digital video disc players; GPS receivers; cargo storage racks, straps or tie-downs; garment hangers, rods or racks; insulated hot or cold-storage containers, mobile office workstation components, portable air compressors or vacuum cleaners, cargo netting and holders; occupant safety features; specially-adapted consumer-use products such as travel tables, camping gear, pet barriers, luggage, etc.; brackets having rigid, swiveling or rotating couplers for removably receiving such consumer use products; storage racks having fixed or retractable support members for storing skis or other gear; and any other articles which may be useful in conjunction with traveling, working or other vehicle use.

Figure 15A:
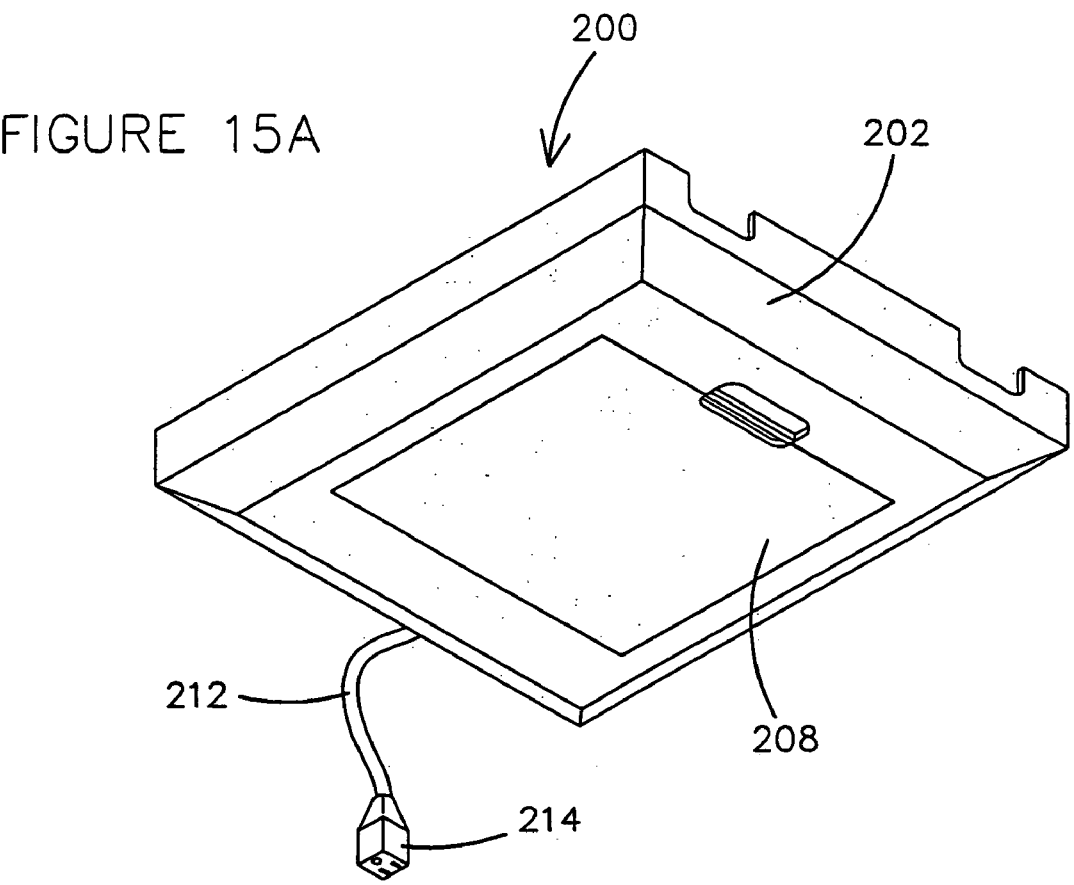
FIG. 15A is a perspective view of a module adapted to receive other modules according to one embodiment.
Figure 15B:
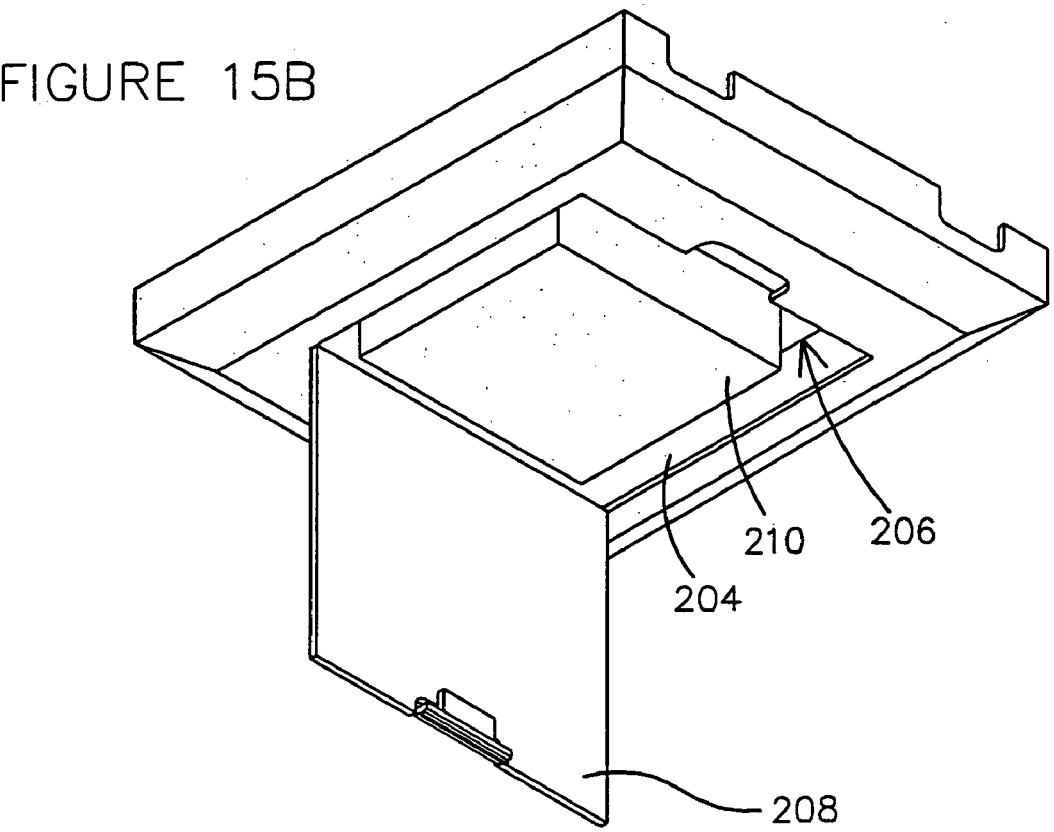
FIG. 15B is another perspective view of a module adapted to receive other modules according to the embodiment of FIG. 15A.
Figure 15C:
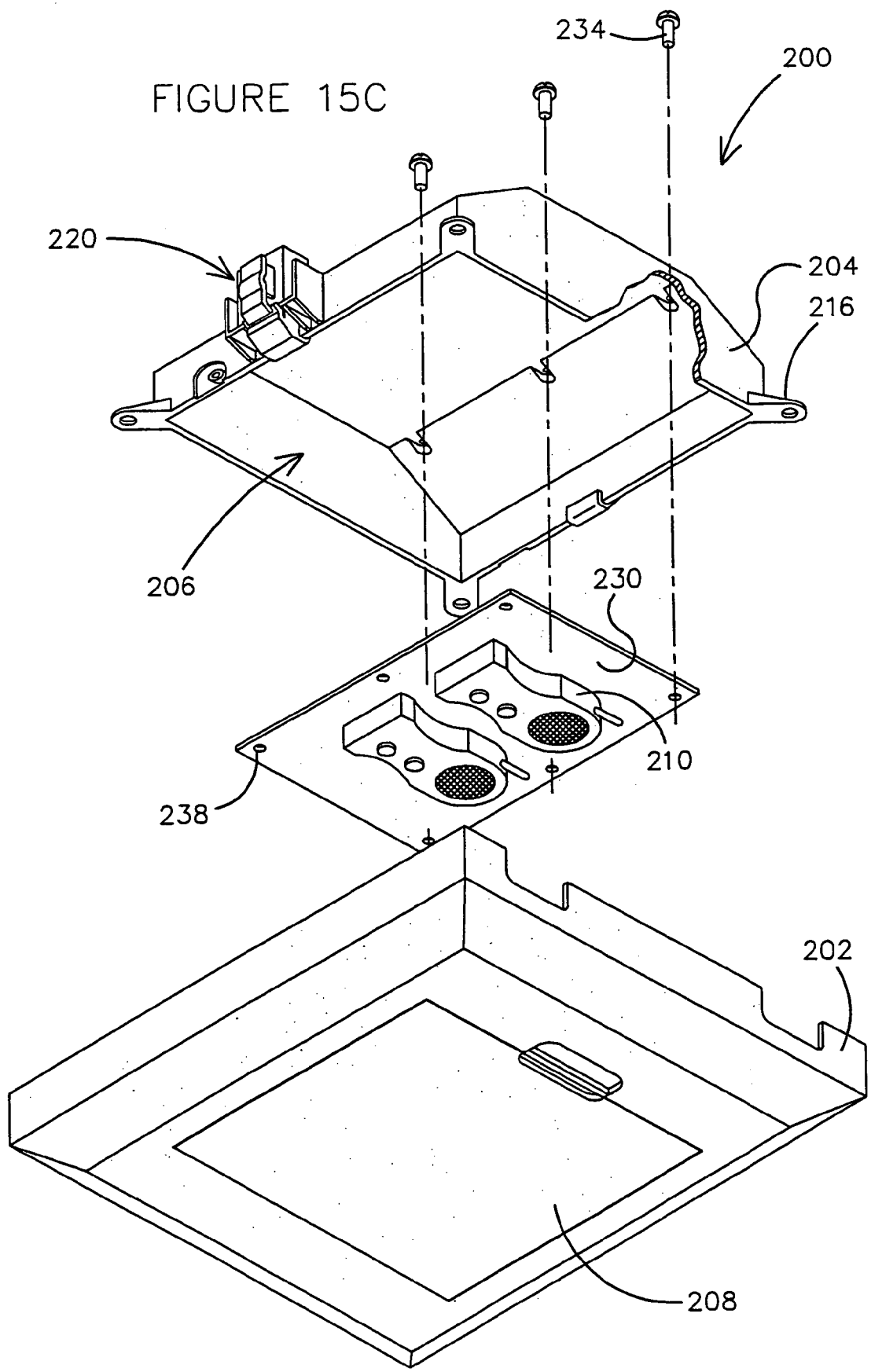
FIG. 15C is an exploded perspective view of a module adapted to receive other modules according to the embodiment of FIG. 15C.

Referring to FIG. 15A through 15C an article configured as a module adapted to receive other modules (e.g. sub-modules, etc.) is shown according to a preferred embodiment. Module 200 (e.g. "starter module", "carrier module", etc.) is shown generally as a storage bin or module having a housing 202 (e.g. cover, trim piece, etc.), a base 204 (e.g. liner, receptacle, frame, etc.) defining a storage space 206 (e.g. cavity, hollow, recess, etc.), and a panel 208 (e.g. door, closure, flap, etc.). Base 204 and storage space 206 are configured to receive other modules (e.g. sub-modules 210, etc.—shown schematically as portable radios in FIG. 15C) that may be designed as after-market products or articles for use or installation by consumers, dealers, etc. Sub-modules 210 may be any suitable article configured for use, storage or display within storage space 210 and adapted for use within or exterior to a vehicle. Utilities (e.g. power, voice, data, etc.) may be provided to the sub-modules through suitable utility carriers 212 (e.g. wires, etc.) that may interface with other utility carriers routed through elongated rails 30 (as shown schematically in FIG. 6) or above a headliner panel (or other panel such as a door panel, trim panel, etc.) and configured to interface via a suitable connector 214 (e.g. of a conventional type). Utility carrier 212 is adapted to provide utilities (e.g. electrical power, data signals, communication signals, etc.) to the sub-modules via suitable connectors (e.g. of a conventional type—not shown). According to any preferred embodiment, the sub-modules may be DVD players, MP3 players/hard drives, XM radio, Blue Connect module, personal data assistant (PDA) and/or mobile phone charging station, Homelink and TravelNote modules, audio speakers, amplifiers, battery packs, power inverters, first aid kits, hand-held radios (e.g. two-way radios, walkie-talkies, etc.), GPS units, tool kits, extendable lights, fishing tackle boxes, camping modules, a hand-held vacuum cleaner, small appliances, mobile phone holders, hands-free phone systems, personal data assistant (PDA) holders, sunglass holders, CD/DVD holders, garment hanging bars, air purifiers, pet guards, satellite radio receivers, or any other suitable device for installation within a module having a bin or other storage compartment. According to an alternative embodiment, the elongated rails may be serve as a conductor for delivering utilities to the sub-modules.

Base 204 is coupled to housing 202 to form a module suitable for receiving sub-modules and attaching to the elongated rails 30 (as shown schematically in FIG. 1). According to a particularly preferred embodiment, base 204 is coupled to housing 202 by suitable fasteners (of a conventional type through suitable structure shown schematically, for example, as tabs or bosses 216 in FIG. 15C). Base 204 further comprises a holder 220 (e.g. clip, clamp, connector, etc.) that may have any suitable form for coupling module 202 to elongated rail 30. According to any preferred embodiment, holder 220 may be in the form of any suitable holder, such as but not limited to holder 100, 120, 140 or 180 (to be further described in reference to FIGS. 7–14). According to a particularly preferred embodiment, holder 220 is in the form of a holder 180 as shown schematically in FIGS. 7 and 8) and is configured to releasably engage recess 38 and/or ledge 40.

According to a particularly preferred embodiment the sub-modules are mountable to an interface such as a bracket 230 (e.g. shell, frame, support, etc.) that is mountable within storage space 206 so that the sub-modules may be retained within storage space 206 and concealed behind panel 208. Bracket 230 may have any suitable shape or contour for mounting within storage space 206 (e.g. flat as shown schematically in FIG. 15C, but may also be recessed with angled sides, rounded sides, etc.). The sub-modules may be mounted to the bracket in any suitable manner to secure the sub-modules to the bracket. For example, the sub-modules may be attached to the bracket by couplers such as selectively releasable structure such as resilient clips or brackets, straps, hook-and-loop fasteners, slide-locks, twist/turn locks, or any other suitable attachment device (not shown). The bracket may be mounted to the base or the module in any suitable manner to retain the sub-module within the storage space (e.g. spring clips, slot-and-tab connectors, etc.—not shown). According to a particularly preferred embodiment, bracket 230 has a rectangular shape with angled sides 232 that corresponds (e.g. fits, nests, etc.) with the interior overhead shape of the base and storage space within module 200 (as shown in FIG. 16B) and is secured by a series of fasteners 234 (shown schematically as six screws) that are received in corresponding connection points (shown schematically as bosses 236) on base 204. Bosses 236 may be provided in any suitable pattern to provide retention of bracket 230 and sub-module 210 within module 200.

Figure 16A:
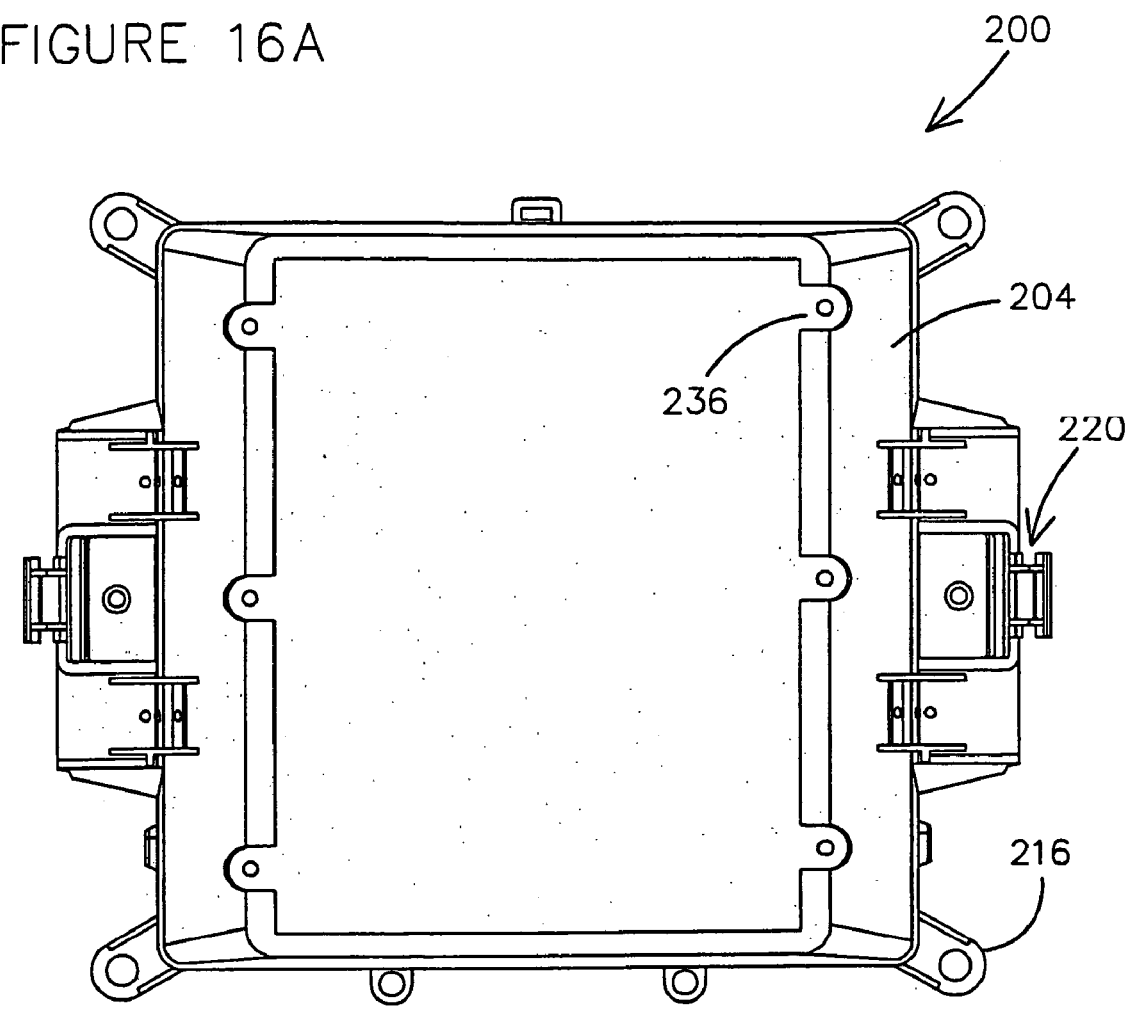
FIG. 16A is a top view of a module adapted to receive other modules according to another embodiment.
Figure 16B:
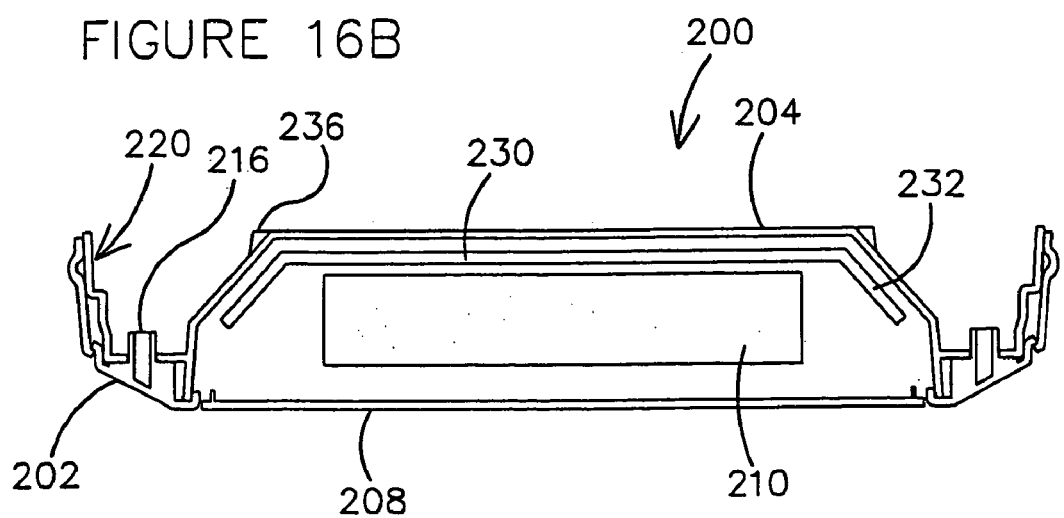
FIG. 16B is an end view of a module adapted to receive other modules according to the embodiment of FIG. 16A.
Figure 16C:
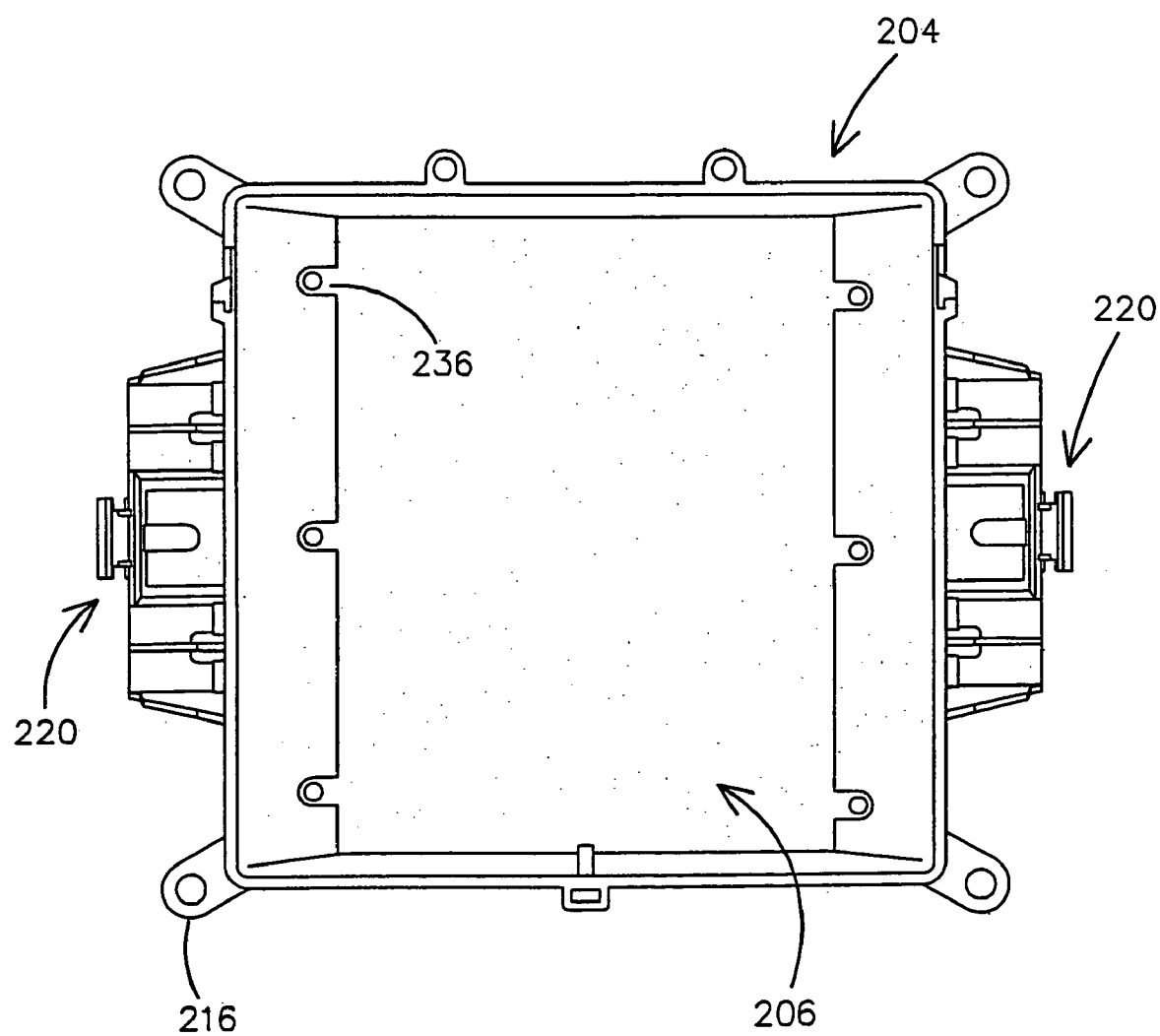
FIG. 16C is a bottom view of a module adapted to receive other modules according to the embodiment of FIG. 16A.

According to a particularly preferred embodiment, bosses 236 are configured in a pattern that provides three bosses on a first side of the module and three bosses on an opposite side of the module (as shown in FIGS. 16A and 16C). Bracket 230 is configured with a pattern of connection points (shown schematically as apertures 238) that correspond to the pattern on base 204 for attachment of bracket 230 to base 204. Bosses 236 may be provided as non-threaded and apertures 238 in bracket may be threaded to receive fasteners 234 such that bracket 230 may be secured to the inside of module 200 within storage area 206 in a manner that conceals the fasteners from when viewed from the interior of the vehicle. According to an alternative embodiment, the bracket may attach within the module in any suitable manner, such as by snap-fit, twist-lock connectors, slide-locks, magnetic attraction, adhesive, hook and loop fasteners (e.g. VELCRO®, etc.) or other conventional attachment devices. According to another alternative embodiment, fasteners (e.g. threaded fasteners, etc.) may be used in any pattern and attachment configuration that is suitable for mounting the bracket within the module. According to a further alternative embodiment, the pattern of connection points on the module and bracket may be provided in a non-symmetric configuration that permits the bracket to be installed in only one orientation within the storage area. According to a further alternative embodiment, the bracket may be omitted and the sub-modules may be attached directly to the base. According to a further alternative embodiment, the panel may have retention structure (e.g. pocket, slots, tabs, clips, brackets, etc.) on an inward side of the panel to secure the sub-modules to an interior side of the panel such that the sub-module may be concealed within the storage space when the panel is in a closed position and the sub-modules may be accessed from the panel when the panel is moved to an open position.

According to any preferred embodiment, the carrier module is configured to provide an internal storage space and connection points in a pattern adapted to receive a sub-module having a bracket or other suitable structure having a corresponding pattern of interfacing connection points. The base and the bracket may be provided in any shape or contour and adapted to releasably retain a wide variety of articles that may stored within the carrier module. The pattern of interfacing connection points may utilize any suitable type of connectors and provided in any suitable pattern for coupling the sub-module to the module. The sub-modules may be non-energized (or otherwise configured for use without a utility supply) or may be energized (or otherwise configured to interface with a utility supply) from the vehicle.

Articles 20 are adapted to be selectively positionable along rails 30, however, articles that may deemed to create a distraction to the vehicle operator, such as video displays and the like, are provided with a mounting interlock feature which prevents their installation in certain prohibited positions along the rails, for example, allowing video monitors to be installed only in a rearward portion of the vehicle. The interlock function may be accomplished by altering the cross sectional shape or profile of a portion of the rails or providing a second recess and ledge, etc. (not shown). Particular articles 20 may be provided with a mounting profile for engaging rails 30 that includes a projection (not shown) that extends into passage 50 whereby installation of a blank (not shown) within a particular portion of passage 50 along rail 30 will prevent mounting such articles in the selected locations. Alternatively, installation of articles may be selectively restricted by otherwise altering the profile of the rails to fit only selected article mounting profiles and may be accomplished by adding a shim (or the like—not shown) along one or more sides of rail 30 or in connection with the passageway of the rail.

As shown generally in FIGS. 7–14, articles 20 that are intended for suspension from a single rail are configured for attachment to the rail by a holder having structure for releasably connecting to the recess 38 and ledge 40 on each side of a rail 30. Articles 20 that are intended for suspension from two rails 30 are configured with a holder on one side of the article for attaching to the recess 38 and ledge 40 on one or both sides of the first rail 30, and having a second holder on the opposite side of the article for attaching to the recess 38 and ledge 40 on one or both sides of the second rail.

Figure 7:
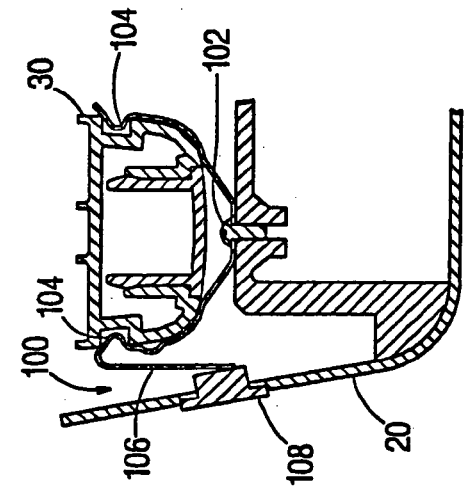
FIG. 7 is a cross sectional view of a holder in an engaged position for a modular system along line 7—7 of FIG. 5 according to one embodiment.
Figure 8:
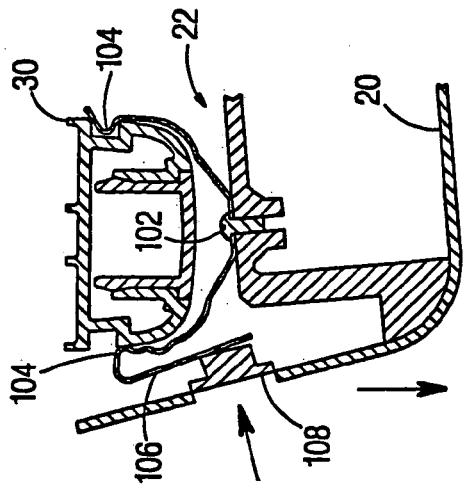
FIG. 8 is the cross sectional view of the holder of FIG. 7 in a released position.

Referring to FIGS. 7 and 8, a component for attaching articles 20 to rails 30 are shown according to one embodiment. A holder 180 (e.g. clamp, spring, clip, etc.) is positioned within an attachment profile 22 (e.g. channel, slot, groove, recess, valley, indent, etc.) on article 20 to align with rail 30 and is attached to article 20 by a conventional fastener 102 (shown as a threaded screw but may include finned plugs, adhesive, integral formation, etc.). Holder 180 is configured to resiliently conform to the exterior of rail 30 and includes catches 184 (e.g. tabs, ears, dogs, etc.) that are biased inwardly to retain catches 184 within recesses 38 on one or both sides of rail 30, whereby catches 184 are vertically supported by ledges 40. An article 20 is removably attached to a rail 30 by aligning holder 180 beneath the rail and exerting force on article 20 whereby catches 184 are forced around sides 36 and catches 184 resiliently fit within recesses 38, where ledge 40 is preferably horizontal (as shown) or angled upwardly and outward to form an angle of 90 degrees or less with recess 38 to ensure secure retention of catch 184. Holder 180 includes an extension 186 fastened to a pivoting latch 188 on an article 20. Extension 186 may be located on either side of holder 180 for an article 20 adapted for suspension from a single rail, and extension 186 is located on exterior side of holder 180 for articles 20 adapted to be suspended from two rails. Pulling downward (or outward) on latch 188 causes catch 184 to release from recess 38 and allow article 20 to be removed from the rail. The additional leverage created by releasing a holder 180 from the rail on a first side of article 20 allows the holder 180 on a second rail to be removed by rotating article 20 in a downward (or outward) direction. In an alternative embodiment, an actuator and a clip having an extension may be positioned on each side of an article for improved ease in removing the article from rails. In one embodiment, holder 180 is preferably made from spring steel stock having dimensions of approximately 1 millimeter thick but may be in the range of 0.5–2.0 millimeters or other dimensions suitable for providing a resilient holding function for an article 20. However, other materials having suitable dimensions and the appropriate rigidity and resiliency such as plastic or hard rubber may be used for holders in alternative embodiments. Catches 184 on holder 180 may be adapted to engage recesses 38 having a height of approximately 9.2 millimeters and a depth of approximately 3.1 millimeters, but may be the height in the range of 7 to 11 millimeters and the depth may be in the range of 2 to 5 millimeters or any other suitable dimensions according to customer specifications. Catches 184 on holder 180 may also be adapted to engage recesses 38 on each lateral side of rail 30 wherein the lateral space between the interior of recesses is approximately 33.8 millimeters, but may be in the range of 26 to 40 millimeters or any other dimensions suitable according to customer specifications. In other alternative embodiments having articles adapted for suspension from two rails, a holder on one side of an article may be replaced by a rigid fixture (not shown) designed to engage an exterior recess on a rail, whereby the rigid fixture is positioned in place first, then the holder on the opposite side is rotated upward (or inward) and into an engaged position on its respective rail.

Figure 9:
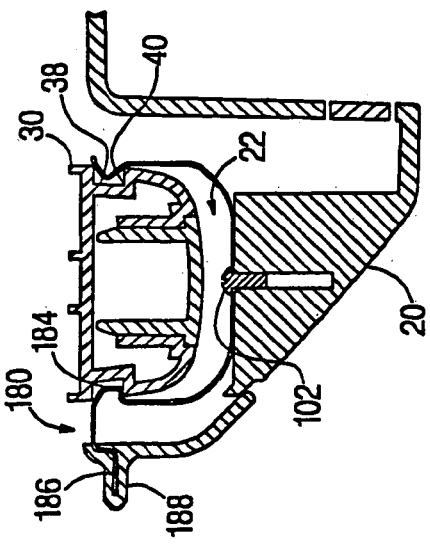
FIG. 9 is the cross sectional view of a holder in an engaged position for a modular system according to another embodiment.
Figure 10:
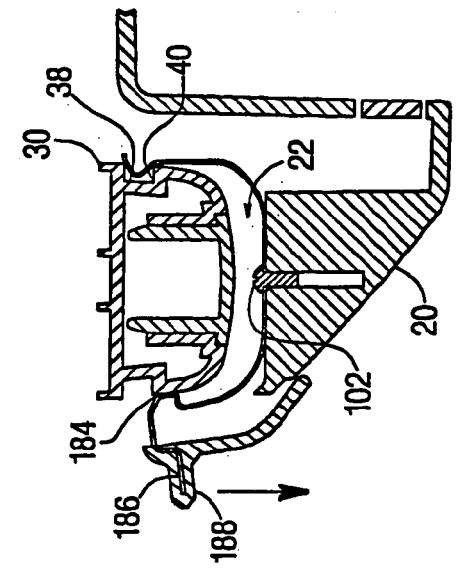
FIG. 10 is the cross sectional view of the holder of FIG. 9 in a released position.

Referring to FIGS. 9 and 10, a component for attaching articles 20 to rails 30 are shown according to another embodiment. A holder 100 (e.g. clamp, spring, clip, etc.) is positioned within an attachment profile 22 (e.g. channel, slot, groove, recess, valley, indent, etc.) on article 20 to align with rail 30 and is attached to article 20 by a conventional fastener 102 (shown as a threaded screw but may include finned plugs, adhesive, integral formation, etc.). Holder 100 is configured to resiliently conform to the exterior of rail 30 and includes catches 104 (e.g. tabs, ears, dogs, etc.) that are biased inwardly to retain catches 104 within recesses 38 on one or both sides of rail 30, whereby catches 104 are vertically supported by ledges 40. An article 20 is removably attached to a rail 30 by aligning holder 100 beneath rail 30 and exerting a force on article 20 whereby catches 104 are forced around sides 36 and catches 104 resiliently fit within recesses 38, where ledge 40 is preferably configured horizontally (as shown) or angled upward and outward to form an angle of 90 degrees or less relative to recess 38. Holder 100 includes an extension 106 configured to resiliently contact an actuator 108 (e.g. pushbutton, etc.) on an article below ledge 40. Extension 106 may be located on either side of holder 100 for an article 20 adapted for suspension from a single rail, and extension 106 is located on exterior side of holder 100 for articles 20 adapted to be suspended from two rails. Extension 106 has a return bend generally in the shape of an inverted "U" and has sufficient stiffness so that manually depressing actuator 108 will outwardly deflect catch 104 sufficiently to clear ledge 40 by simultaneously pulling downward on article 20. The additional leverage created by releasing a holder 100 from a rail 30 on a first side of article 20 is intended to allow the holder 100 on a second rail to be removed by rotating article 20 in a downward (or outward) direction. In an alternative embodiment, an actuator and a clip having an extension may be positioned on each side of an article for improved ease in removing the article from the rails. In other alternative embodiments having articles adapted for suspension from two rails, a holder on one side of an article may be replaced by a rigid fixture (not shown) designed to engage an exterior recess on a rail, whereby the rigid fixture is positioned in place first, then the holder on the opposite side is rotated upward (or inward) and into an engaged position on its respective rail.

Figure 11:
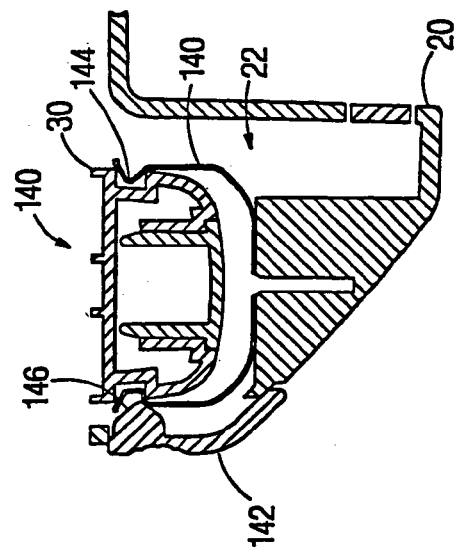
FIG. 11 is the cross sectional view of a holder in an engaged position for a modular system according to a further embodiment.
Figure 12:
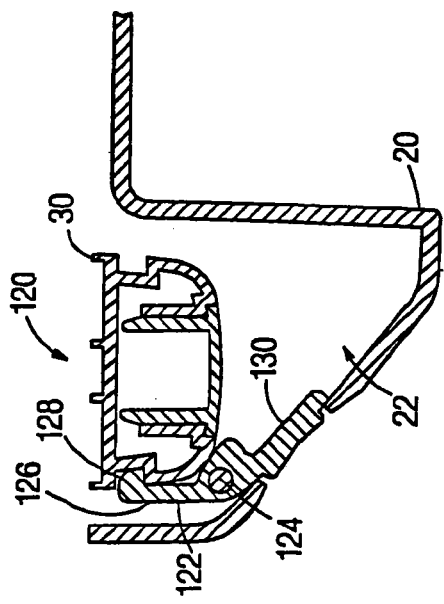
FIG. 12 is the cross sectional view of the holder of FIG. 11 in a released position.

Referring to FIGS. 11 and 12, a component for attaching articles 20 to rails 30 is provided according to another embodiment. A holder 120 includes a latch 122 (e.g. hook, catch, clasp, etc.) pivotally attached to article 20 at pivot 124 in a position aligned with an outward side of a rail 30. Latch 122 has an upper end 126 above pivot 124 with a projection 128 extending inwardly therefrom that is shaped to engage recess 38 and ledge 40 of rail 30. Latch 122 also has a lower end 130 below pivot 124 that includes an actuator portion 132 cooperating with an aperture 134 in article 20. Latch 122 is biased so that projection 128 is urged inwardly and actuator 132 is urged outwardly. Biasing of latch 122 may be accomplished by a coil spring (not shown) operating about the axis of pivot 124, or by a leaf spring (not shown) positioned between article 20 and upper end 126. Latch 122 is shown having an obtuse angle shape but may have any suitable shape adapted to provide an actuator surface on article 20 and for engaging rail 30. Latch 122 may be used in conjunction with an article adapted for suspension from a single rail, where a single latch 122 is used to engage recess 38 one side of a rail, and article 20 includes a rigid structure (not shown) designed to engage recess 38 on the opposite side of rail 30. Such an article 20 may be removably attached to rail 30 by inserting the rigid structure over ledge 40 and exerting a force on the opposite side of article 20 whereby latch 122 resiliently rides over outward side 36 of the rail and engages recess 38. Latch 122 may also be used in conjunction with an article 20 adapted for suspension from two parallel rails, where a latch 122 is positioned on one or both sides of article 20 to engage a recess 38 and ledge 40 on the outward side 36 of rails 30. Where a latch 122 is used on only one side of such an article 20, a rigid structure (not shown) would be provided on the opposite side of article 20, whereby article 20 is installed by first engaging the rigid structure to recess 38 and then exerting an upward (or inward) force on the opposite side of article 20 whereby latch 122 resiliently rides over outward side 36 of the rail and engages recess 38. In any configuration, article 20 may be selectively released by depressing actuator 132 to disengage projection 128 from recess 38 and then pulling and/or rotating article 20 downward (or outward).

Figure 13:
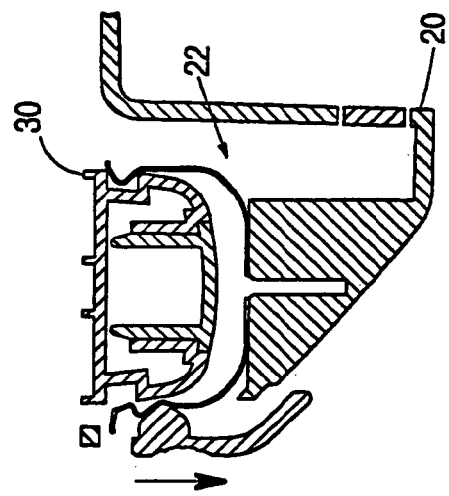
FIG. 13 is the cross sectional view of a holder in an engaged position for a modular system according to yet another embodiment.
Figure 14:
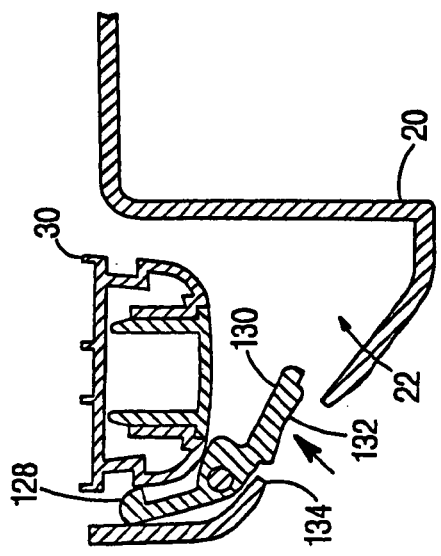
FIG. 14 is the cross sectional view of the holder of FIG. 13 in a released position.

Referring to FIGS. 13 and 14, a component for attaching articles 20 to rails 30 is provided according to another embodiment. A latch 142 is coupled to article 20 and configured for vertical sliding engagement with a holder 140. Holder 140 is coupled to article 20 and positioned for alignment with rail 30. Holder 140 is generally "U" shaped to fit around rail 30, and configured with inwardly projecting catches 144 for engaging recesses 38. The side of holder 140 oriented to engage latch 142 is outwardly biased whereby sliding latch 142 downward will allow catches 144 to deflect outward for removal or installation of article 20. Latch 142 is coupled to article 20 in a manner that permits vertically slidable operation, whereby detent 146 on latch 142 provides a resistance closure with latch 142 in the upward position and catch 144 engaged within recess 38.

In an alternative embodiment, the holders may be replaced with fasteners (e.g. set screws configured to engage the rail, etc.) that may be loosened for installation of article 20 on the rails and then the fastener may be tightened to secure the article to the rail, or loosened for subsequent repair, replacement, or reorientation within the vehicle.

Figure 3:
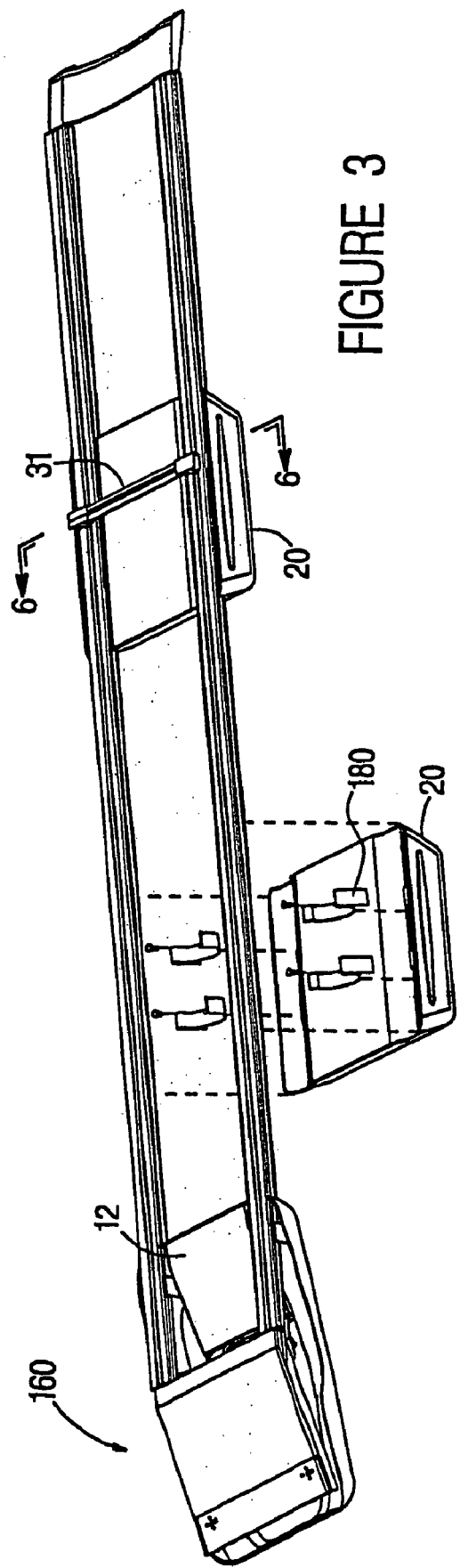
FIG. 3 is a downward looking perspective view of a modular system according to the embodiment of FIG. 1.

Referring to FIGS. 3 and 5, a utility interface 160 for system 10 is shown schematically according to a preferred embodiment. Interface 160 is included within the cover 12 for communicating with passageways through the roof structure (not shown) and interfacing with rails 30. Interface 160 includes a series of ports 162 (e.g. connectors, receptacles, jacks, plugs, etc.) for facilitating the interconnection of conventional utility carriers 163 (e.g. wires, cables, conductors, harnesses, etc.) for delivering utilities (e.g. electrical power, voice and data communication signals, RF transmission signals, instrumentation signals, etc.) between a supply source (not shown) and articles 20 mounted to rails 30. Utilities may be routed from the utility supply source (e.g. a battery, antenna, receiver, transmitter, etc.—not shown) through utility carriers 163 that interconnect the supply source and the ports 162 provided in interface 160. Utility interface 160 may be provided in either the forward or rearward portion of the vehicle.

In the illustrated embodiment, utilities may be distributed from interfaces 160 via additional utility carriers 164 that interconnect between interfaces 160 and articles 20. The utility carriers 164 may be distributed throughout system 10 by routing the carriers 164 through passage 50 in rails 30 where the carriers 164 are concealed behind cover 54 (shown in FIG. 6) and articles 20. Articles 20 are mounted over rails 30 and their covers segments 54. One or more gaps or other openings may be provided between the cover segments for access and egress of utilities carriers 164 for interfacing with articles 20, to create a utilities access pattern. The access pattern is intended to be adaptable to future changes or modifications in the article selection package by making suitable changes in the cover 54. Articles 20 and utility carriers 164 may be provided with mating connectors 166 to facilitate ease of installation, replacement or reconfiguration of articles 20 within the system 10. Alternatively, articles 20 may be provided with a fixed length of utility carrier for routing through passage 50 to interface 160, where the carrier includes a terminal at the outward end configured for directly connecting with interface 160. To provide additional flexibility in distributing utilities to various articles, an article 20 may be configured to serve as a utility storage or junction box for housing additional utility distribution devices or components and for storing excess quantities of utility carrier that may be desirable for accommodating future changes to the article selection package.

According to another embodiment, low-voltage electrical power in the range of approximately 12–42 volts DC or other suitable voltage range for powering articles 20 may be routed to articles 20 via rails 30 that are fabricated entirely or partially from aluminum or other electrically conductive material. Rails 30 may also be fabricated from a non-conducting material such as plastic, where a conducting material such as copper or aluminum is integrally formed with rail 30 in the shape of a longitudinal conducting strip, rail or bar (not shown) to provide a uniform electric current access path from interface 160 to articles 20. Such conducting material may be affixed the rail by ultrasonic welding, molding, interference-type snap insert, or vacuum metallization. Articles 20 may be provided with an electrically conductive contactor (not shown) that projects outwardly from a surface of article 20 and is configured to contact rail 30 or a conducting strip thereon (not shown) and remains concealed between rail 30 and article 20 when article 20 is installed on rail 30 to provide a conductive electrical path to the article. The contactor may be spring-biased for urging the contactor into continuous contact with rail 30 or a conducting strip when article 20 is mounted on rails 30. In a system with two parallel rails, one rail has a positive electrical polarity (i.e. battery potential) and the second rail has a negative electrical polarity (i.e. ground). For embodiments using a single rail, two longitudinal conducting strips (not shown) may be used on the rail to provide positive and negative conductors, corresponding to appropriately positioned contactors on the article configured to mount to a single rail.

Conducting strips may be used as an article "positioning interlock" along the rails by altering the conducting strip longitudinal position along the rail to provide a power interlock profile. The power interlock profile ensures that contactors for certain articles will properly interface (i.e. "match-up") with the conducting strips only when the articles are installed at certain locations on the rails that correspond to an "approved" position. For example, video display articles may have contactors positioned to match a conducting strip position corresponding only to a location rearward of the front seats of the vehicle. Similarly, other consumer articles that may create a distraction to a vehicle operator may be electrically interlocked so that they are operable only when installed in positions that are preestablished by the power interlock profile. Insulating cover segments (not shown) may be provided that are adapted to cover portions of the rails that remain exposed after installation of the article selection package to prevent consumer exposure or electrical shorts to ground with the energized portions of system.

It is important to note that the construction and arrangement of the elements of the modular system for a vehicle provided herein is illustrative only. Although only a few exemplary embodiments of the present invention have been described in detail in this disclosure, those skilled in the art who review this disclosure will readily appreciate that many modifications are possible in these embodiments (such as variations in installation location and orientation within a vehicle, sizes, structures, shapes and proportions of the various elements, mounting arrangements, use of materials, colors, combinations of shapes, etc.) without materially departing from the novel teachings and advantages of the invention. For example, the modular system may be used in the interior of any vehicle (such as an automobile, truck, sport utility vehicle, van, boat, airplane, train, construction or farming equipment, tractor trailer trucks, motor homes and recreational vehicles, etc.). Further, the carrier modules may be provided in any suitable shape and may use any suitable type and pattern of connectors for attaching sub-modules in a manner to store or conceal the sub-modules when not in use, and to provide access to the modules when desired by a user. According to other alternative embodiments, the modular system may be used in connection with articles such as camping gear that are designed to adapt to a stationary vehicle environment. Further, it is readily apparent that elongated rails may be provided in a wide variety of shapes, sizes, thickness, and engagement profiles and adapted for installation along the roof, floor and sides of a vehicle, or within a cargo area or other suitable location within a vehicle. It is also readily apparent that the articles may be designed with any profile suitable for attaching to one or more rails and may be adapted for slidable movement along the rails. Accordingly, all such modifications are intended to be within the scope of the invention as defined in the appended claims.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed in the appended claims.

What is claimed is:

1. A system for attaching articles within a vehicle, comprising:
   at least one rail configured for attachment to an overhead portion of the vehicle, the rail defining a pair of opposed support ledges;
   a channel extending substantially along the rail;
   one or more covers engagable with the channel to provide an access pattern to the channel;
   an article having a housing defining a storage compartment configured to receive an object;
   at least one holder having a first portion coupled to the article and a second portion configured to engage the channel and move between a first position to engage the support ledges and a second position to disengage the support ledges;
   so that the article and the object are removably supported by the rail.

2. The system of claim 1 wherein the second portion of the holder comprises a resilient clip.

3. The system of claim 1 wherein the rail comprises a pair of substantially parallel rails extending longitudinally along at least a portion of a headliner panel within the vehicle.

4. The system of claim 1 further comprising a utility system for providing electrical power to the article.

5. The system of claim 4 wherein the article includes at least one electrical connector configured to mate with a connector that provides a source of electricity from the vehicle.

6. The system of claim 1 wherein the article comprises at least one of a storage device, a communications device and a media device.

7. The system of claim 1 wherein the article comprises a module and the housing comprises a base configured to removably support the object.

8. The system of claim 7 wherein the object comprises at least one of a communication device, a media device, and a consumer product.

9. An overhead rail system for a vehicle interior, comprising:
   an elongated rail member configured to extend at least partially along a headliner panel within the vehicle interior;
   a longitudinal slot provided at least partially along a length of the rail member and defining at least one supporting ledge;
   an article having a housing defining a storage compartment and a movable panel configured to provide access to an object within the storage compartment;
   a holder coupled to the article and having at least one catch configured to releasably coact with the slot in the rail member, the catch having a flexible member that is movable between a first position to engage the support ledge and a second position to release the support ledge when the article is located at any one of a plurality of locations on the rail member;
   so that the article is mountable to the rail member proximate the headliner panel for use by occupants within the vehicle interior.

10. The system of claim 9 wherein the slot faces away from the headliner panel.

11. The system of claim 9 wherein the slot comprises a first slot on a first side of the rail member and a second slot on a second side of the rail member.

12. The system of claim 9 wherein the holder is configured to permit the article to rotate relative to the rail member.

13. The system of claim 9 wherein the rail member further comprises at least one electrically conductive strip configured to engage at least one contactor on the article.

14. The system of claim 9 wherein the article is a plurality of articles and the holder is configured to permit the articles to be interchangeably mounted to the rail member.

15. An overhead system for use in a vehicle interior, comprising:
   a headliner panel;
   at least one rail connected to the headliner panel by connectors and configured to face the vehicle interior;
   a utility interface module coupled to the rail and configured to transmit at least one of a communication signal and data signal;
   a pair of opposed ledges extending along the rail;
   a channel along the rail proximate at least one of the ledges; and
   at least one article for use within the vehicle interior and configured to receive a signal from the utility interface module, the article having a latch with a projection engagable with the channel and configured to be supported by the opposed ledges to secure the article to the rail.

16. The system of claim 15 further comprising at least one wire routed at least partially along the rail and configured to provide electricity to the article.

17. The system of claim 16 further comprising an electrical connector coupled to the wire and configured to connect with an electrical connector on the article.

18. The system of claim 15 wherein the rail further comprises an electrically conductive strip.

19. The system of claim 15 wherein the connectors comprise at least one of a Z-axis clip and a Christmas-tree fastener.

20. The system of claim 15 further comprising a trim piece covering at least one end of the rail.

21. The system of claim 15 wherein the article comprises a housing configured to receive an object therein.

22. The system of claim 21 wherein the article is configured to provide a source of electricity to the object.

23. A modular overhead console system for an interior portion of a vehicle, comprising:
    at least one rail member configured for attachment to an overhead panel within the vehicle;
    a pair of ledges extending substantially along the rail member;
    a slot extending substantially along the rail member proximate at least one of the ledges to define a support structure;
    at least one module having a housing defining a storage compartment capable of receiving an object therein;
    a holder coupled to the module and having at least one projection movable between a first position to engage the support structure and a second position to disengage the support structure when the module is located at any one of a plurality of locations on the rail member, so that the module is attachable to the rail member at the location for positioning within an overhead interior area of the vehicle.

24. The system of claim 23 further comprising an electrically conductive strip extending at least partially along the rail member and configured to engage a conductive contact so that power can be provided to the object.

25. The system of claim 23 wherein the holder comprises a generally U-shaped clip.

26. The system of claim 23 wherein the projection on the holder is configured to resiliently engage the rail member.

27. The system of claim 23 wherein the at least one rail member comprises two generally parallel rail members.

28. The system of claim 23 wherein the overhead panel is a headliner panel.

29. The system of claim 23 further comprising a latch coupled to the projection and operable to release the article from the rail by disengaging the projection from the slot.

30. The system of claim 23 wherein the object comprises an electronic device.

31. The system of claim 23 wherein the at least one module is a plurality of modules attachable to the rail member.

32. A modular overhead console system for an interior portion of a vehicle, comprising:
    at least one rail coupled to an overhead-panel within the vehicle;
    a pair of support ledges extending at least partially along the rail;
    a channel extending at least partially along the rail;
    one or more covers engagable with the channel to provide an access pattern to the channel;
    at least one module having a housing defining a storage compartment capable of receiving at least one object therein and configured for rotational access by a user;
    a holder coupled to the module and configured to enter the channel and engage the support ledges, so that the module is attachable to the rail.

33. The system of claim 32 wherein the overhead panel comprises a headliner.

34. The system of claim 32 wherein the housing further comprises a door panel configured to provide drop-down access to the object.

35. The system of claim 32 wherein the module is slidable along the rail.

36. The system of claim 32 wherein the module is positionable at a plurality of locations along the rail.

37. The system of claim 32 wherein the rail is configured to provide electrical power to the module.

* * * * *